(12) United States Patent
Kremer et al.

(10) Patent No.: US 11,927,735 B2
(45) Date of Patent: Mar. 12, 2024

(54) ACOUSTO-OPTICAL DEVICE AND METHOD

(71) Applicant: Leica Microsystems CMS GmbH, Wetzlar (DE)

(72) Inventors: Manuel Kremer, Leimen (DE); Felix Neugart, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 870 days.

(21) Appl. No.: 16/962,245

(22) PCT Filed: Jan. 15, 2019

(86) PCT No.: PCT/EP2019/050868
§ 371 (c)(1),
(2) Date: Jul. 15, 2020

(87) PCT Pub. No.: WO2019/138119
PCT Pub. Date: Jul. 18, 2019

(65) Prior Publication Data
US 2021/0063715 A1    Mar. 4, 2021

(30) Foreign Application Priority Data
Jan. 15, 2018 (DE) .................. 10 2018 100 762.0

(51) Int. Cl.
*G02F 1/33* (2006.01)
*G02B 21/00* (2006.01)
*G02F 1/11* (2006.01)

(52) U.S. Cl.
CPC ..... *G02B 21/0064* (2013.01); *G02B 21/0032* (2013.01); *G02B 21/0036* (2013.01);
(Continued)

(58) Field of Classification Search
CPC .................................... G02F 1/33; G02F 1/11
See application file for complete search history.

(56) References Cited

U.S. PATENT DOCUMENTS

| 4,498,770 A | 2/1985 | Corwin et al. |
| 5,694,216 A * | 12/1997 | Riza ................ G01B 9/02007 356/485 |
| 6,281,948 B1 | 8/2001 | Deter |

FOREIGN PATENT DOCUMENTS

| CN | 201017131 Y | 2/2008 |
| CN | 103453988 A | 12/2013 |

(Continued)

OTHER PUBLICATIONS

Helmchen, Fritjof and Winfried Denk, "Deep tissue two-photon microscopy", Nature Methods, vol. 2, No. 12, 932-940, Nov. 18, 2005.

(Continued)

*Primary Examiner* — Joseph P Martinez
(74) *Attorney, Agent, or Firm* — Leydig, Voit & Mayer, Ltd.

(57) ABSTRACT

An apparatus for reducing a chromatic spread angle of light diffracted at an acousto-optic element includes the acousto-optic element and a first and a second focusing optical unit. The acousto-optic element is disposed in a beam path of an incident light beam and is configured to generate the diffracted light from the incident light beam such that the diffracted light emanates from a virtual interaction point of the acousto-optic element. The first focusing optical unit is disposed in the beam path upstream of the acousto-optic element and the second focusing optical unit is disposed in the diffracted light such that a focus of the incident light beam is situated downstream of the first focusing optical unit in the acousto-optic element and the virtual interaction point is located in a front focus of the second focusing optical unit.

15 Claims, 4 Drawing Sheets

(52) U.S. Cl.
CPC ............... *G02F 1/116* (2013.01); *G02F 1/33* (2013.01); *G02B 21/0076* (2013.01)

(56) References Cited

FOREIGN PATENT DOCUMENTS

| JP | S53-117448 | A | 10/1978 | |
|---|---|---|---|---|
| JP | H01265131 | * | 10/1989 | ............ G01J 3/0208 |
| JP | H01265131 | A | 10/1989 | |
| JP | H01-282515 | A | 11/1989 | |
| JP | H11249181 | A | 9/1999 | |
| JP | 2003065850 | * | 3/2003 | .............. G01J 11/00 |
| JP | 2003065850 | A | 3/2003 | |
| JP | 2008209429 | A | 9/2008 | |

OTHER PUBLICATIONS

Zeng, Shaoqun et al., "Simultaneous compensation for spatial and temporal dispersion of acousto-optical deflectors for two-dimensional scanning with a single prism", Opt. Lett., vol. 31, No. 8, 1091-1093, Apr. 15, 2006.

Kremer, Y. et al., "A spatio-temporally compensated acousto-optic scanner for two-photon microscopy providing large field of view", Opt. Express, vol. 16, No. 14, 10066-10076, Jul. 7, 2008.

\* cited by examiner

ACOUSTO-OPTICAL DEVICE AND METHOD

CROSS-REFERENCE TO PRIOR APPLICATIONS

This application is a U.S. National Phase Application under 35 U.S.C. § 371 of International Application No. PCT/EP2019/050868, filed on Jan. 15, 2019, and claims benefit to German Patent Application No. DE 10 2018 100 762.0, filed on Jan. 15, 2018. The International Application was published in German on Jul. 18, 2019 as WO 2019/138119 under PCT Article 21(2).

FIELD

The present invention relates to the field of light microscopy, in particular multiphoton microscopy.

The invention relates to an apparatus for reducing the chromatic spread angle of light diffracted at an acousto-optic element, comprising the acousto-optic element and two focusing optical units. Moreover, the invention relates to a method for reducing the chromatic spread angle of light diffracted at an acousto-optic element.

BACKGROUND

Independently of the method employed, a significant challenge in many fields of light microscopy lies in the provision of excitation light at one or more specified wavelengths. Depending on the type of microscopy method and/or depending on the type of sample, one or more excitation light beams, which, as a rule, must have specified spectral properties, may be necessary.

By way of example, in the field of fluorescence microscopy, it is important to use light at the wavelength that excites the fluorescence. Different wavelengths are needed, in particular, if the sample contains fluorescent substances with different excitation spectra.

In the fields of multiphoton microscopy and confocal scanning microscopy (confocal microscopy), particular interest lies in adapting the intensities for certain wavelengths or switching certain wavelengths on or off.

To this end, use can be made of wavelength-selective elements which are based on the acousto-optic effect. As a rule, such acousto-optic elements have a so-called acousto-optic crystal which is made to vibrate by means of an acoustic transducer. As a rule, such a transducer has a piezoelectric material and two or more electrodes contacting this material. By applying radio frequencies to the electrodes, said radio frequencies typically lying in the range between 10 MHz and 10 GHz, the piezoelectric material is excited to vibrate such that an acoustic wave that passes through the crystal can arise. Acousto-optic crystals are distinguished in that the soundwave arising changes the optical properties of the crystal. In particular, a periodic modulation of the local refractive index is achieved. This modulation acts like a (Bragg) grating and can diffract light of an appropriate wavelength.

Examples of such acousto-optic elements include acousto-optic modulators (AOM), acousto-optic deflectors (AOD), acousto-optic tunable filters (AOTF), acousto-optic beam splitters (AOBS) and acousto-optic beam mergers (AOBM). Within the scope of this application, an AOM should be understood to mean, in general, an acousto-optic element that influences or modulates incident light in terms of frequency and/or propagation direction and/or intensity depending on the soundwave generated therein. Thus, an AOD, for example, represents a specific embodiment of an AOM, which is specialized in respect of influencing the propagation direction, while an AOTF is an AOM which, in particular, exploits the filter properties of the acousto-optic modulator. The relatively fast modulability of the acoustic wave together with the low costs in comparison with other processes (e.g., by electro-optic effects) make AOMs the standard tool for light modulation in laser scanning microscopes.

AOMs are widespread in multiphoton microscopy. Here, use is usually made of femtosecond lasers with wavelengths in the red to near infrared range (F. Helmchen and W. Denk, "Deep tissue two-photon microscopy", Nature Methods 2, 932-940 (2005)). Typical values are wavelengths of between 650 nm and 1300 nm, pulse lengths between 50 fs and 200 fs, pulse energies of several 100 nJ at repetition rates of the order of 100 MHz and linear polarization.

Depending on field of use and requirements, AOMs and, in general, acousto-optic elements or acousto-optics can be optimized in respect of different parameters. Design parameters can include:
- chromatic collinearity of the $+1^{st}/-1^{st}$ order of diffraction (the so-called used beams);
- diffraction efficiency;
- spectral bandwidth (spectral width) of the efficiently diffracted light at an applied radio frequency;
- angle sensitivity of the input beam; and
- frequency and amplitude range of the radio frequencies.

In particular, the chromatic collinearity of the $+1^{st}/-1^{st}$ order of diffraction (also written $\pm 1^{st}$ order of diffraction below), i.e. the collinearity of the used beams of different wavelengths among themselves, is of increased importance for use in multiphoton microscopy. Expressed differently, within the scope of this application, chromatic collinearity of the $\pm 1^{st}$ order of diffraction means the collinearity of the diffracted beams of the $+1^{st}$ order of diffraction, which have different wavelengths, among themselves or of the $-1^{st}$ order of diffraction, which have different wavelengths, among themselves. This definition of chromatic collinearity applies equivalently to higher orders of diffraction as well (i.e., in general, $\pm n^{th}$ order of diffraction with $n \geq 1$).

If an AOM is impinged by a light pulse of a given central wavelength $\lambda$ and a spectral bandwidth $\Delta\lambda$, a $\pm 1^{st}$ order of diffraction is generated, the latter usually serving as a used beam. On account of the finite diffraction efficiency, the zeroth order of diffraction can generally still be detected; however, on account of the poor modulability by the AOM in comparison with the $\pm 1^{st}$ order of diffraction, it typically finds no use.

On account of the finite spectral bandwidth of the light pulse there is angle splitting of the $\pm 1^{st}$ order of diffraction by the acousto-optic element: the different color components of the light pulse are diffracted in slightly different directions by the acousto-optic element. Consequently, there is no chromatic collinearity of the $\pm 1^{st}$ order of diffraction. The statements in the paragraphs above naturally also apply equivalently to higher orders of diffraction.

The size of this fanning by the acousto-optic element is referred to below as "chromatic spread angle" (CSA) and it is defined as the derivative of the diffraction angle $\varphi$ of the diffracted light with respect to its wavelength $\lambda$: $CSA = d\varphi/d\lambda$. The CSA therefore is a measure of the strength of the deviation from perfect chromatic collinearity within an order of diffraction and has units of mrad/nm. The greater the spectral bandwidth of the light radiated onto the acousto-optic element, the greater the angular range in which light is diffracted (in the case of an unchanging CSA), too. Consequently, a compensation or reduction of the CSA in the case of light with a great spectral bandwidth is particularly desirable for an efficient use of the diffracted light since this angular range is also reduced with the CSA.

For use in (multiphoton) microscopy, a CSA that is too big is problematic for two reasons: firstly, the different propagation directions of the color components of a femtosecond light pulse cause the beam profile to become elliptic with advancing propagation and consequently the entrance pupil of the excitation objective lens to not be optimally illuminated, leading, inter alia, to a poorer resolution or reduced power (when swamping the entrance pupil). Secondly, the various color components of the light pulse strike the entrance pupil at different angles, as a consequence of which they are spatially separated in the sample. This spatial separation (reference is also made to a "spatially chirped light pulse" or "spatial chirp"), just like a non-simultaneous incidence of the color components ("temporal chirp"), reduces the peak intensity and thus the efficiency of the multiphoton excitation.

The disadvantages arising from the first point, the ellipticity dependent on the propagation path (or the "spatial chirp"), can be compensated according to the prior art by virtue of the virtual interaction point of the AOM being imaged into the entrance pupil of the objective lens by way of a suitable relay optical unit and not even allowing ellipticity to arise. Within the scope of this application, the virtual interaction point (diffraction point) of an acousto-optic element, in particular of an AOM, should be understood to mean the point obtained if the beam profiles of the rays emerging from the acousto-optic element are extended counter to the physical propagation direction of the light and the point of intersection thereof is determined.

For solving the second problem ("temporal chirp"), in particular, the prior art uses prisms (S. Zeng et al., "Simultaneous compensation for spatial and temporal dispersion of acousto-optical deflectors for two-dimensional scanning with a single prism", Opt. Lett. 31, 1091-1093 (2006)), gratings or further acousto-optic components (Y. Kremer et al., "A spatio-temporally compensated acousto-optic scanner for two-photon microscopy providing large field of view", Opt. Express 16, 10066-10076 (2008)) which, in suitable arrangements, essentially ensure that the CSA arising due to the AOM is compensated again. However, these approaches are either relatively expensive or inflexible (e.g., when changing the laser wavelength).

SUMMARY

In an embodiment, the present invention provides an apparatus for reducing a chromatic spread angle of light diffracted at an acousto-optic element. The apparatus includes the acousto-optic element and a first and a second focusing optical unit. The acousto-optic element is disposed in a beam path of an incident light beam and is configured to generate the diffracted light from the incident light beam such that the diffracted light emanates from a virtual interaction point of the acousto-optic element. The first focusing optical unit is disposed in the beam path upstream of the acousto-optic element and the second focusing optical unit is disposed in the diffracted light such that a focus of the incident light beam is situated downstream of the first focusing optical unit in the acousto-optic element and the virtual interaction point is located in a front focus of the second focusing optical unit.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

In an embodiment, the present invention provides a cost-effective and flexible apparatus which greatly reduces the above-described CSA of the light which was diffracted by an acousto-optic element, in particular an AOM, so that qualitatively high-quality multiphoton microscopy is possible. A further embodiment of the present invention provides a corresponding method.

In contrast to the aforementioned solution approaches from the prior art, in which the spectral components of a light beam or laser pulse are compensated in terms of location and direction in relation to the acousto-optic element by way of suitable optical components, an embodiment of the present invention only ensures the collinearity of the chromatic components at the location of the objective lens pupil. Said components are then imaged onto the same location on the sample side.

On the basis of this approach according to an embodiment of the invention, a technical implementation was found for a lens system with a surprisingly simple structure, which is consequently producible in cost-effective fashion, which can flexibly cooperate with an acousto-optic element, and which meets high quality demands in respect of the compensation of the CSA of the diffracted light.

According to an embodiment of the invention, an apparatus is provided for reducing the chromatic spread angle of light diffracted at an acousto-optic element and comprises the acousto-optic element which is disposed in the beam path of an incident light beam and which generates the diffracted light from the incident light beam, said diffracted light emanating from a virtual interaction point of the acousto-optic element, and is characterized in that the apparatus furthermore comprises two focusing optical units, wherein the first focusing optical unit is disposed in the beam path upstream of the acousto-optic element and the second focusing optical unit is disposed in the diffracted light and one focus of the incident light beam is situated downstream of the first focusing optical unit in the acousto-optic element and the virtual interaction point is located in the front focus of the second focusing optical unit.

In principle, an embodiment of the invention with optical units with the shortest focal length possible is preferred since this reduces the chromatic parallel offset. However, depending on the design of the respective acousto-optic element, this can lead to a more or less pronounced reduction in diffraction efficiency: the acousto-optic element typically diffracts the incident light inefficiently in the case of an increasing specific entrance angle of the incident light (angle between the optical axis and beam profile). Therefore, a compromise has to be found in practice between the parallel offset and diffraction efficiency, with the specific application being taken into account.

As a result of the second optical unit downstream of the acousto-optic element spaced apart from the virtual interaction point by its focal length, the chromatic components (here, a chromatic component refers to the diffracted light at one wavelength) propagate substantially in collinear fashion with respect to one another and with respect to the optical axis. However, since such an arrangement focuses the chromatic components or the resultant light beam and consequently indirectly leads to a divergence of the resultant light beam, a first optical unit, which counteracts this divergence of the light beam, is required upstream of the acousto-optic unit. By focusing the incident light beam, the first optical unit upstream of the acousto-optic element ensures that the diffracted light at all wavelengths (i.e., all chromatic components) respectively has the smallest possible beam diameter in the acousto-optic element.

The apparatus according to an embodiment of the invention is advantageously usable in the case of a pulsed incident light beam with particularly short pulse durations, in particular, since the spectral width, and hence angular range into which light is diffracted, increases with shortening pulse durations. Thus, a reduction of the CSA becomes required or at least desirable.

Here, the application of the apparatus in a multiphoton microscope or in the field of multiphoton microscopy, which typically uses pulse durations of the used light in the region of a few hundred femtoseconds, is mentioned in exemplary fashion. According to an embodiment of the invention, the incident light beam consequently is pulsed light, in particular light originating from a pulsed light-emitting laser light source (pulsed laser light source, pulsed laser, pulse laser), with a pulse duration of no more than 1000 fs (i.e., ≤1000 fs), preferably no more than 800 fs (≤800 fs), preferably no more than 500 fs (≤500 fs), preferably no more than 300 fs (≤300 fs), particularly preferably no more than 200 fs (≤200 fs) and very particularly preferably no more than 100 fs (≤100 fs).

According to an embodiment of the invention, the diffracted light is diffracted light of $+1^{st}/-1^{st}$ order, since light of these orders is preferably used for microscopic purposes.

By way of example, the principle can be implemented using cylindrical lenses and/or spherical lenses. The advantage of the use of cylindrical lenses lies in lower peak intensities (maximum intensities) in the crystal and, in particular, on the crystal surfaces. To improve the imaging properties, achromatic and/or aspherical lenses, for example, are also possible. The described embodiment of the invention can also be implemented using curved mirrors, with the non-occurrence of chromatic aberrations being advantageous here in comparison with the use of standard lenses. Such mirrors can be embodied with a spherical structure or (for the purposes of avoiding spherical aberrations) as parabolic mirrors. For reasons of geometry, a parabolic mirror of "off-axis" parabolic (OAP) structure lends itself to this end under certain circumstances. In general, the optical units used may contain one or more lenses and/or mirrors and/or further optical elements such as filters or prisms, with a wide variety of combinations being conceivable.

Consequently, according to further preferred embodiments of the invention, the first focusing optical unit and/or the second focusing optical unit comprise at least one mirror and/or at least one lens.

According to a particularly preferred implementation of the apparatus according to an embodiment of the invention, particularly preferred since it is structurally simple and cost-effective, the first focusing optical unit and/or the second focusing optical unit consists of a lens, in particular a spherical lens or a cylindrical lens. The use of a cylindrical lens becomes expedient since the AOM breaks the rotational symmetry of the beam profile as it brings about splitting in one spatial direction only. In the case where both focusing optical units are implemented by individual lenses, the focusing optical units preferably both consist of spherical lenses or both consist of cylindrical lenses. This ensures that the beam does not unnecessarily get focused or become divergent in one dimension.

As already mentioned above, an embodiment of the invention is implemented particularly preferably with use of an acousto-optic modulator (AOM).

As mentioned above, an apparatus according to embodiments of the invention is particularly suitable for use in microscopy and, therein, in the field of scanning microscopy, in particular multiphoton microscopy. Thus, according to a further embodiment of the invention, a microscope, in particular a multiphoton microscope, contains an apparatus according to an embodiment of the invention.

Here, the microscope (or microscope system) with such an apparatus (e.g., a multiphoton microscope) can comprise a pulsed light-emitting laser light source for sample illumination, which can generate the light beam entering into the apparatus with a pulse duration of no more than 1000 fs (i.e., ≤1000 fs), preferably no more than 800 fs (≤800 fs), preferably no more than 500 fs (≤500 fs), preferably no more than 300 fs (≤300 fs), particularly preferably no more than 200 fs (≤200 fs) and very particularly preferably no more than 100 fs (≤100 fs). The apparatus according to an embodiment of the invention reduces the CSA of light diffracted at the acousto-optic element of the apparatus, said diffracted light being generated from the incident pulsed light beam. In this context, it should be observed once again that the spectral width, and hence angular range, into which the light is diffracted increases with shortening pulse duration and so the use of a microscope with an apparatus according to an embodiment of the invention for reducing the CSA is particularly advantageous in the case of short pulse durations.

The method according to an embodiment of the invention for reducing the chromatic spread angle (CSA) of diffracted light, which was diffracted by an acousto-optic element, is preferably implemented using an apparatus according to an embodiment of the invention.

A person skilled in the art active in the field of the present invention, who has knowledge of the above-described apparatus features of the solution according to embodiments of the invention, will design method steps corresponding to the apparatus features, preferably for using the above-described apparatus. In this respect, reference is made to the preceding part of the description for the purposes of avoiding repetition.

Figure 1:
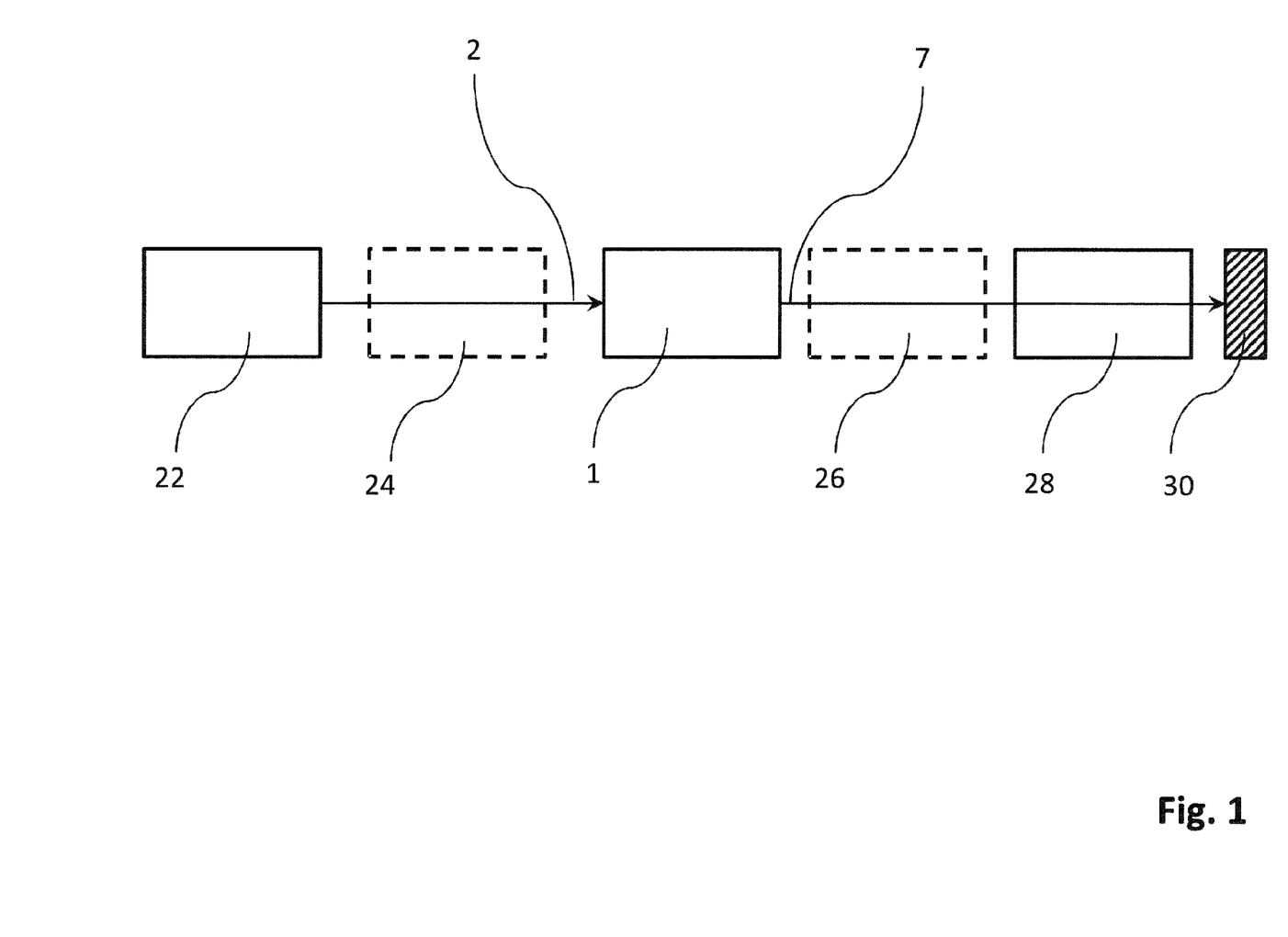
FIG. 1 schematically shows the typical illumination beam path of a scanning microscope.

FIG. 1 shows, in greatly simplified form, the typical illumination beam path of a scanning microscope, for example a multiphoton microscope, with an acousto-optic element 1, in particular an AOM, as beam modulation means. Proceeding from a light source 22, for example a laser, in particular a pulsed laser, an incident light beam 2 arrives at the acousto-optic element 1, optionally via a beam guiding and adapting optical unit 24. From said acousto-optic element, the light 7 diffracted at the acousto-optic element 1 reaches the objective lens 28 via an optional imaging and scanning optical unit 26 and finally reaches the sample 30.

Figure 2:
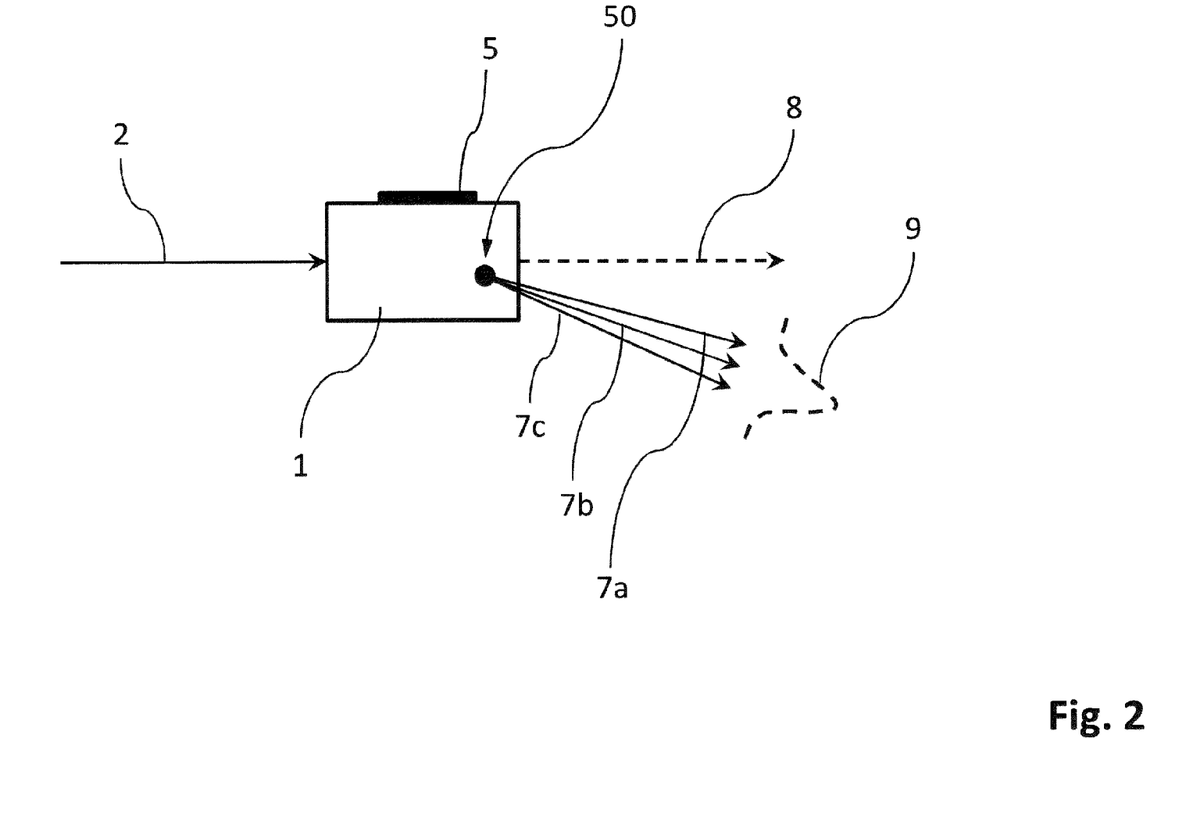
FIG. 2 schematically shows the diffraction process at an AOM.

FIG. 2 schematically shows the diffraction process at an AOM 1, which is impinged by an incident light beam 2 at a given central wavelength λ and a spectral bandwidth Δλ. A transducer 5 is attached to the crystal of the AOM 1, said transducer impressing a radio frequency (RF) into the crystal. A ±1$^{st}$ order of diffraction of the diffracted light 7, which usually serves as used beam, is generated at the grating arising in the process. As a rule, the zeroth order of diffraction 8 can also still be detected on account of the finite diffraction efficiency. On account of the non-perfect chromatic collinearity of the first order of diffraction and the finite spectral bandwidth of the incident light pulse 2, there is an angular split 9 of the first ±1$^{st}$ order of diffraction, in which the various color components of the light pulse are diffracted in slightly different directions. This is shown in exemplary fashion for three partial beams 7a, 7b, 7c at three different wavelengths $\lambda_1$, $\lambda_2$, and $\lambda_3$. The extent of this fanning of the diffracted light is specified by way of the chromatic spread angle (CSA) in units of mrad/nm. These diffracted partial beams 7a, 7b, 7c emanate from a virtual interaction point 50 of the AOM 1, which is obtained if the beam profiles are extended counter to the physical direction of propagation and the point of intersection is determined without taking account of possible diffraction effects at the transition between the crystal of the AOM 1 and the surrounding medium.

Figure 3:
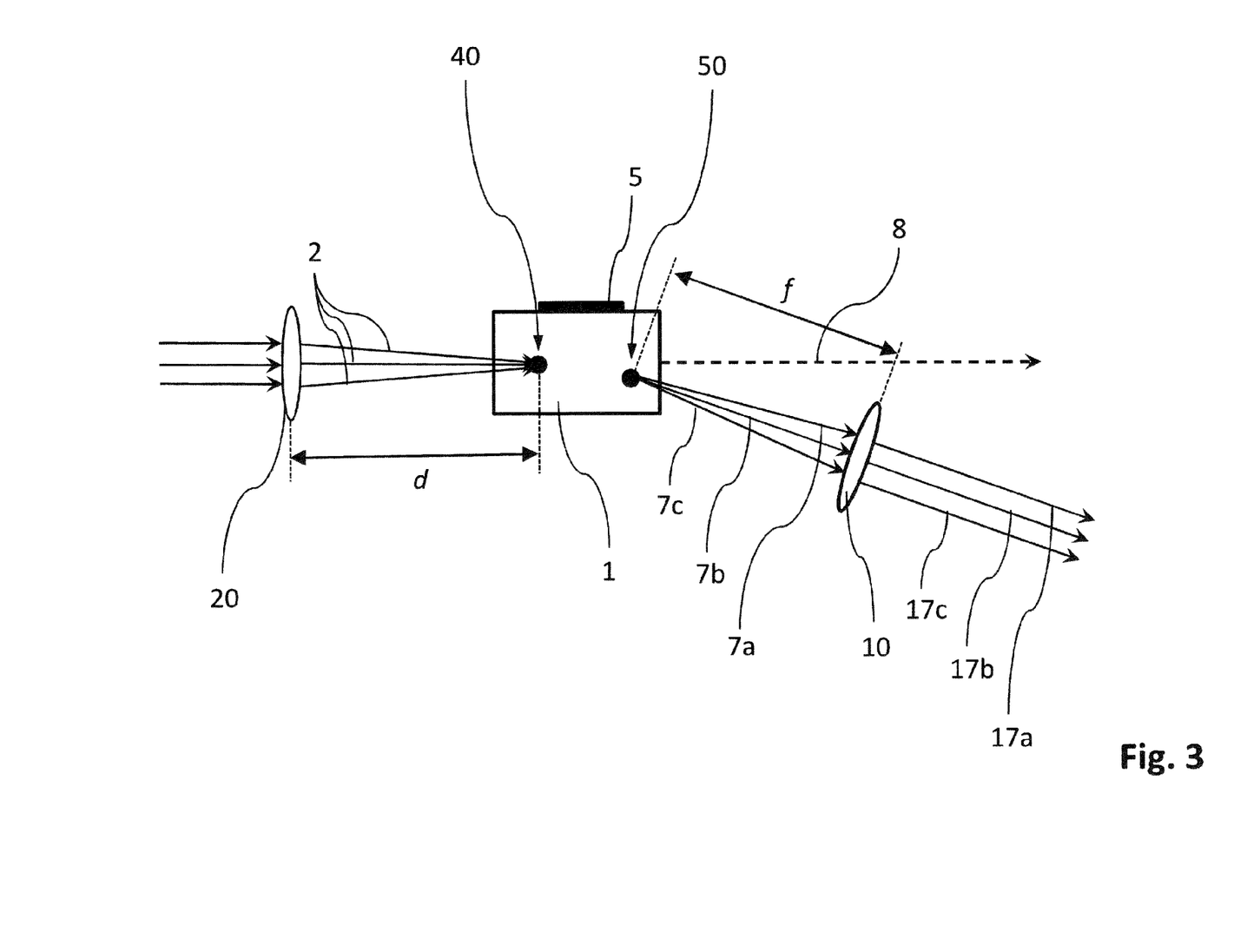
FIG. 3 shows a schematic illustration of an apparatus according to and embodiment of the invention.

FIG. 3 shows a schematic illustration of an apparatus according to an embodiment of the invention, in which a first optical unit 20 (e.g., a single lens) is situated upstream of an AOM 1 and a second optical unit 10 (likewise, e.g., a single lens) is situated downstream of the AOM 1. The first optical unit 20 is positioned such that the light beams of the incident light 2, focused thereby, are focused at a focus 40 in the AOM 1, which focus is at a distance d from the first optical unit 20, i.e., the beam profiles of the light beams of the incident light 2 intersect at a point in the crystal. (In the drawing, diffraction effects when the light moves from the surrounding medium into the crystal have not been illustrated to provide a clearer overview; however, these should naturally be taken into account when placing the first optical unit 20. The distance d typically does not correspond to the focal length of the optical unit 20 in the surrounding medium, e.g., in air.) The second optical unit 10 is positioned downstream of the AOM 1 in such a way that the chromatic components of the, e.g., ±1$^{st}$ order of diffraction, shown in exemplary fashion using the partial beams 7a, 7b, 7c, extend in chromatic collinear fashion with respect to one another (chromatic collinearity). These chromatic partial beams 7a, 7b, 7c transition into the partial beams 17a, 17b, 17c. The collimated beam (containing the partial beams 17a, 17b, 17c) generated thus is forwarded to the sample 30. The distance between the second optical unit 10 and the virtual interaction point 50 consequently corresponds to the focal length f of the second optical unit 10. Here, the second optical unit 10 serves to obtain the chromatic collinearity of the ±1$^{st}$ order of diffraction and hence to collimate the diffracted light while the first optical unit 20 compensates to the best possible extent, or at least counteracts, unwanted divergences in the chromatic partial beams 17a, 17b, 17c (see FIG. 4) and in the resultant light beam.

Figure 4:
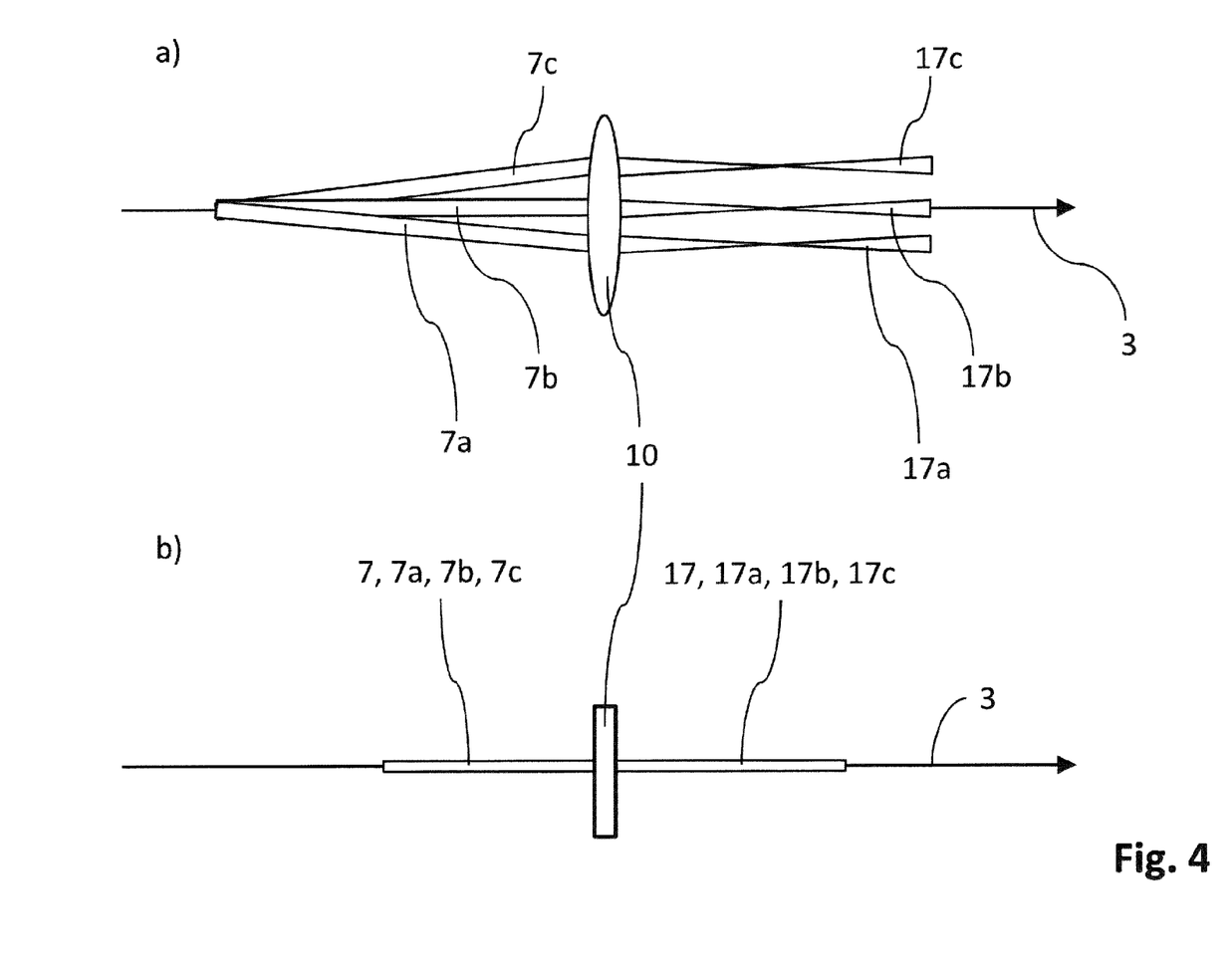
FIG. 4 shows, schematically and in sections, the beam profile if a cylindrical lens is used as the second optical unit.

FIG. 4 shows a detailed view of the beam profile when a cylindrical lens is used as a second optical unit 10, schematically and in sections, with the arrangement being illustrated from two perspectives in partial views a) and b) of FIG. 4, said perspectives being rotated through 90° with respect to one another in relation to the optical axis 3. The chromatic partial beams 7a, 7b, 7c are each focused by the cylindrical lens 10, leading to unwanted divergences in one spatial direction in the partial beams 17a, 17b, 17c and in the resultant light beam downstream of the cylindrical lens 10 (see partial view a) of FIG. 4). These divergences are compensated to the best possible extent by the first optical unit 20 upstream of the AOM 1 by virtue of this first optical unit 20 ensuring by way of the focusing carried out thereby that the diffracted light at all wavelengths (i.e., the chromatic components), illustrated in exemplary fashion in FIG. 3 by the partial beams 7a, 7b, 7c, respectively has the smallest possible beam diameter.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A microscope, comprising:
a pulsed light emitting laser light source with a pulse duration of ≤1000 fs, the pulsed light emitting laser light source being configured to provide an incident light beam; and
an apparatus for reducing a chromatic spread angle of light diffracted at an acousto-optic element, the apparatus comprising:
the acousto-optic element which is disposed in a beam path of the incident light beam and is configured to generate the diffracted light from the incident light beam such that the diffracted light emanates from a virtual interaction point of the acousto-optic element; and
a first and a second focusing optical unit, the first focusing optical unit being disposed in the beam path upstream of the acousto-optic element and the second focusing optical unit being disposed in the diffracted light such that a focus of the incident light beam is situated downstream of the first focusing optical unit in the acousto-optic element and the virtual interaction point is located in a front focus of the second focusing optical unit.

2. The microscope of claim 1, wherein the diffracted light is diffracted light of the +1$^{st}$/−1$^{st}$ order.

3. The microscope of claim 1, wherein the first focusing optical unit and/or the second focusing optical unit comprises at least one mirror.

4. The microscope of claim 1, wherein the first focusing optical unit and/or the second focusing optical unit comprises at least one lens.

5. The microscope of claim 1, wherein the first focusing optical unit and/or the second focusing optical unit consists of a spherical lens or cylindrical lens.

6. The microscope of claim 1, wherein the acousto-optic element comprises an acousto-optic modulator.

7. The microscope of claim 1, wherein the microscope comprises a multiphoton microscope.

8. The microscope of claim 1, wherein the pulse duration is ≤100 fs.

9. A method for reducing, in a microscope, a chromatic spread angle of light diffracted at an acousto-optic element which is disposed in a beam path of an incident light beam generating the diffracted light from the incident light beam such that the diffracted light emanates from a virtual interaction point of the acousto-optic element, the method comprising:

emitting light from a pulsed light emitting laser light source with a pulse duration of ≤1000 fs so as to provide the incident light beam;

focusing the incident light beam through a first focusing optical unit at a focus, wherein the focus is situated in the acousto-optic element;

generating the diffracted light from the incident light beam by the acousto-optic element, wherein the diffracted light emanates from the virtual interaction point of the acousto-optic element; and passing the diffracted light through a second focusing optical unit, wherein the virtual interaction point is located in a front focus of the second focusing optical unit.

10. The method of claim 9, wherein the diffracted light is diffracted light of the +1$^{st}$/−1$^{st}$ order.

11. The method of claim 9, wherein the first focusing optical unit and/or the second focusing optical unit comprises at least one mirror.

12. The method of claim 9, wherein the first focusing optical unit and/or the second focusing optical unit comprises at least one lens.

13. The method of claim 9, wherein the first focusing optical unit and/or the second focusing optical unit consists of a cylindrical lens.

14. The method of claim 9, wherein the acousto-optic element comprises an acousto-optic modulator.

15. The method of claim 9, wherein the pulse duration is ≤100 fs.

\* \* \* \* \*